United States Patent
Maignan et al.

(10) Patent No.: US 7,001,656 B2
(45) Date of Patent: Feb. 21, 2006

(54) RIGID MULTILAYER MATERIAL FOR THERMAL INSULATION

(75) Inventors: Michel Maignan, Pins Justaret (FR); Thierry Youssefi, Labastidette (FR); Bertrand Brevart, Toulouse (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/420,809

(22) Filed: Apr. 23, 2003

(65) Prior Publication Data
US 2003/0207075 A1    Nov. 6, 2003

(30) Foreign Application Priority Data
May 6, 2002    (FR) .................................. 02 05634

(51) Int. Cl.
*B32B 3/00*    (2006.01)
*B31D 3/02*    (2006.01)
*E04C 2/36*    (2006.01)

(52) U.S. Cl. .................. 428/73; 428/116; 428/316.6; 428/317.1; 428/426; 428/457; 52/783.1; 52/793.1; 52/794.1; 156/197; 156/250; 156/305; 156/320

(58) Field of Classification Search .................. 428/73, 428/131, 116–118, 220, 304.4, 309.9, 332, 428/313.3, 316, 316.6, 317.1, 426, 432, 433, 428/438, 457, 458, 615, 621, 622, 624, 650, 428/672; 52/783.1, 793.1, 794.1, 794; 156/197, 156/198, 217, 250, 295, 305, 320
See application file for complete search history.

(56) References Cited

U.S. PATENT DOCUMENTS

| 4,061,812 A |   | 12/1977 | Gilwee, Jr. et al. |
| 5,242,651 A | * | 9/1993 | Brayden et al. ............. 264/510 |
| 5,270,092 A | * | 12/1993 | Griffith et al. ................ 428/69 |
| 5,474,262 A | * | 12/1995 | Fiore ....................... 244/158 A |
| 5,792,295 A | * | 8/1998 | Huebner et al. ............. 156/197 |

FOREIGN PATENT DOCUMENTS

| DE | 3527061 A1 | 2/1987 |
| FR | 948 904 A | 8/1949 |
| GB | 2 316 651 A | 3/1998 |
| WO | WO 99/04966 A1 | 2/1999 |

* cited by examiner

Primary Examiner—Stephen Stein
(74) Attorney, Agent, or Firm—Sughrue Mion, PLLC

(57) ABSTRACT

The invention relates to a rigid multilayer material for thermal insulation, in particular in a vacuum, the material comprising at least one insulating plate of honeycomb material sandwiched between two aluminum- or gold-coated skins of low emissivity. In order to optimize thermal insulation, the diameter of the cells is at least twice their height. The multilayer material may have as many layers as needed. The cells of adjacent layers may be offset in order to further minimize paths for heat conduction through the structure. Holes may be pierced in the side walls of the cells in order to allow them to empty out when the material is put into a vacuum. The invention also provides a method of making such a material.

17 Claims, 2 Drawing Sheets

FIG_1
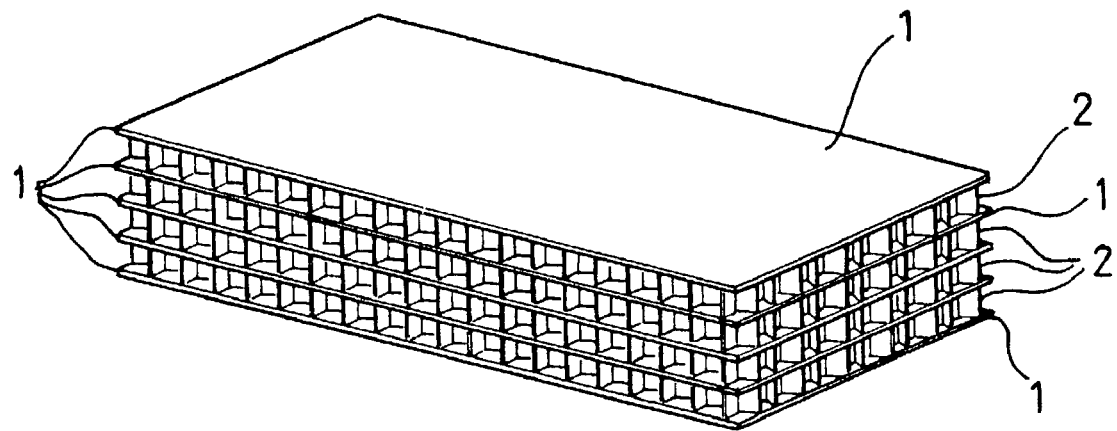
FIG_2
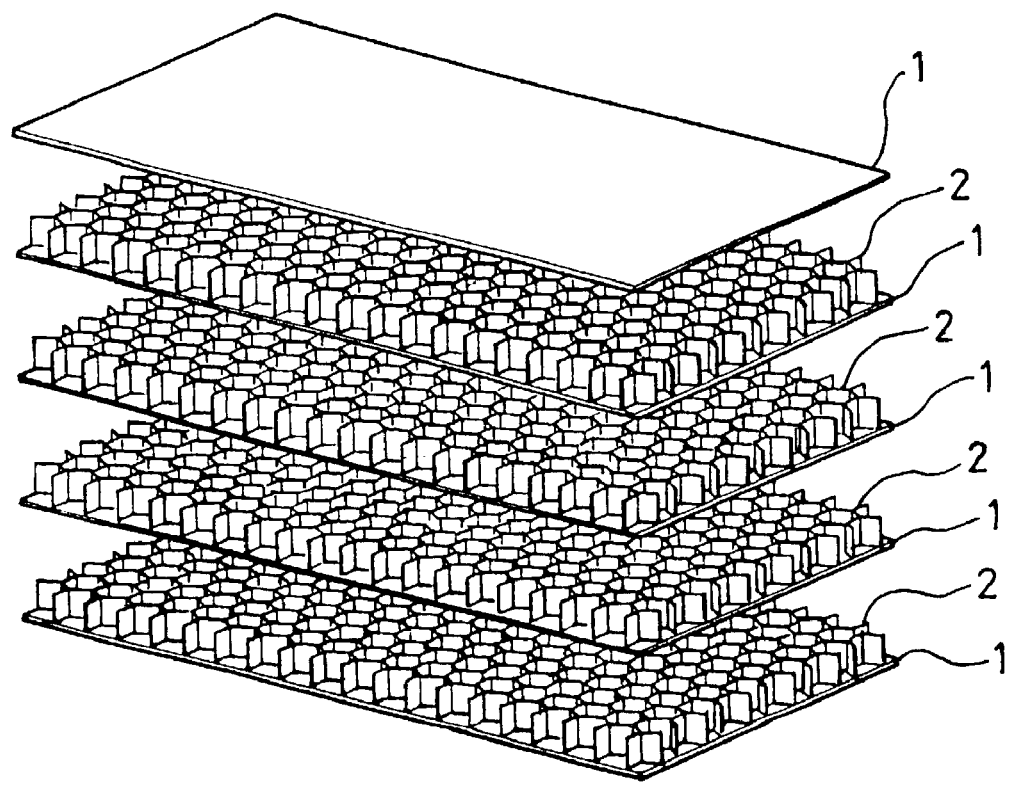

FIG_3
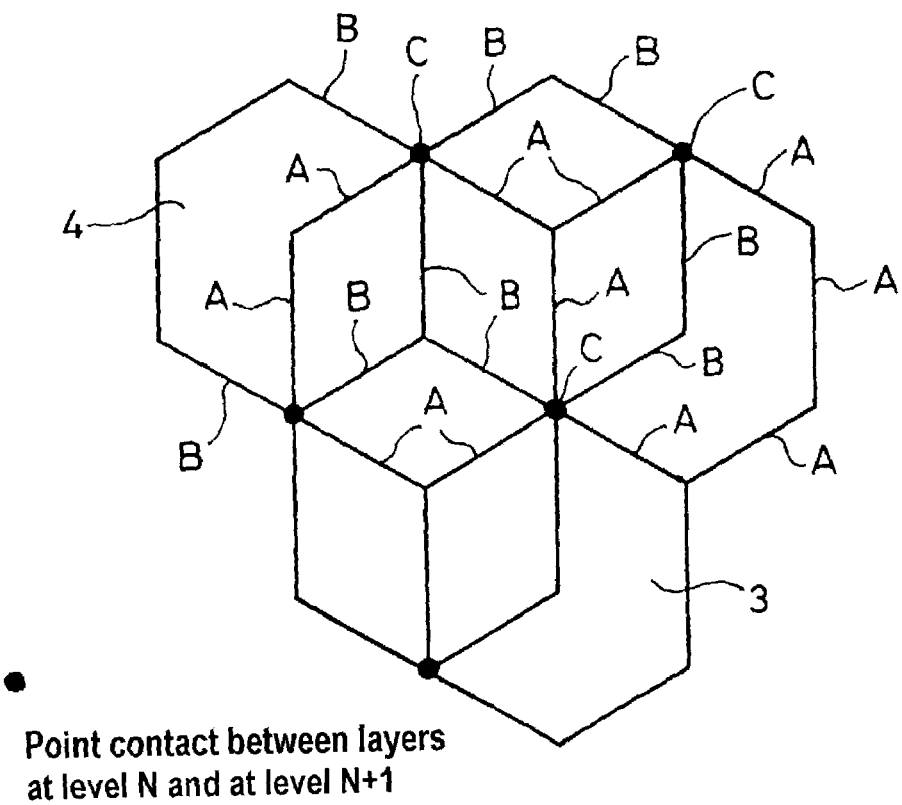
● Point contact between layers at level N and at level N+1
FIG_4
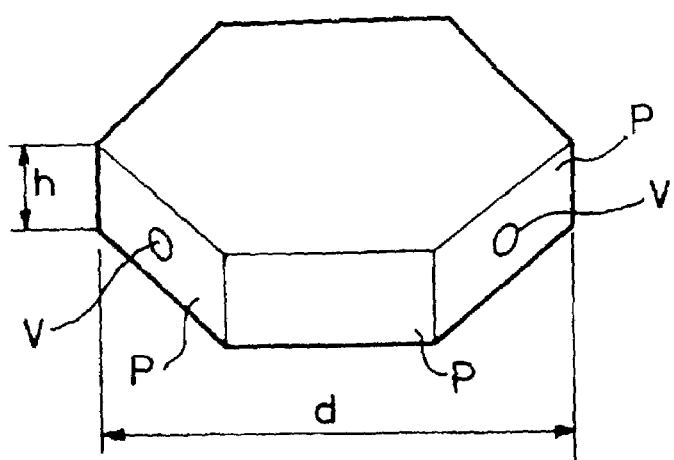

RIGID MULTILAYER MATERIAL FOR THERMAL INSULATION

BACKGROUND OF THE INVENTION

The rugged conditions of launching and of the environment in space include, amongst other things, high levels of acceleration and vibration, temperature extremes, and the transition between atmospheric pressure and the vacuum of space. Furthermore, every kilogram is very expensive to launch.

Thus, for structural elements, it is desirable for materials to be rigid and lightweight, presenting very good dimensional stability and thus little thermal expansion, associated with good ability to withstand any mechanical deformation that might be due to vibration or acceleration, and good behavior in the vacuum of space (little degassing, etc.).

In certain applications, a structure in space needs to withstand and contribute to maintaining a large temperature difference: it is then necessary to have a material that is thermally insulating. An example of such an application concerns containers for cryogenic substances, where the temperature difference across the structure can be of the order of several hundreds of degrees.

A material that is commonly used for space applications is honeycomb material. Honeycomb material does indeed resemble the structure built by bees in a hive, i.e. a plane array of cells that are substantially hexagonal having walls constituting partitions between adjacent cells.

Honeycomb structures are light in weight and can be made very rigid relative to their weight. They can be stiffened, for example by multilayer lamination, possibly having plane "skins" which are stuck to the end edges of the cell walls, thereby closing the cells.

In order to make such an insulating structure, it is known to improve insulation by providing protection in insulating layers, known in the art as multilayer insulation (MLI).

Putting MLI into place is a difficult manual operation which requires a large amount of cutting out. It is difficult to put MLI in hidden places. In addition, small radii of curvature degrade its qualities. Cuts in the MLI, its positioning by means of Velcro with possible sagging, and the fixing zones of the structure itself are all potential causes of heat leakage. Conductivity between the structure and its fixing point is large.

With that method, the two functions of rigidity and of insulation are separate.

Document D1=U.S. Pat. No. 5,230,914 discloses an insulating material having a honeycomb of paper which is designed for use in temperature insulated food packaging so as to maintain refrigeration temperatures during transport. The honeycomb is sandwiched between two skins of aluminized paper. According to the teaching of that document, the effect of the honeycomb is to reduce heat transfer through the insulating material by reducing convection between the two skins. That effect is obtained by keeping air captive inside cells that are as small as possible, thereby preventing the air from moving.

Although analogous in shape to the honeycomb materials already known for use in space, the honeycomb of document D1 is totally unsuitable for space applications for several reasons. Firstly the material from which it is made: paper or card are materials that are not sufficiently clean and that are not sufficiently strong for use in space flight. In addition, the looked-for effect comes from air being held captive in the cells, whereas in space there should no longer be any air therein. Without any inside air, the teaching of D1 can no longer operate.

OBJECTS AND SUMMARY OF THE INVENTION

An object of the present invention is to mitigate the drawbacks of materials known in the prior art. For this purpose, the invention provides a rigid multilayer material for thermal insulation, in particular in a vacuum, the material comprising at least one plate of insulating honeycomb material sandwiched between two aluminum- or gold-coated skins of low emissivity, the material being characterized in that said honeycomb material comprises a plurality of cells of diameter (in the plane of said plate) that is at least twice their height (perpendicular to said plate).

In a preferred embodiment, the side walls of said holes are pierced in order to allow said material to empty out when it is put in a vacuum.

In a variant, the material may comprise a plurality, N, of honeycomb plates sandwiched between at least two aluminum- or gold-coated skins.

In a preferred embodiment of this variant, the cells of adjacent plates are offset laterally so as to minimize points of contact between the walls of the cells in one plate and the walls of the cells in an adjacent plate.

In a preferred embodiment, said aluminum- or gold-coated skins are made of an insulating structural material such as glass-epoxy.

In another preferred embodiment, said honeycomb material is made of a highly insulating material such as amorphous polyetherimide (PEI) sold under the name ULTEM or NOMEX® (Dupont Nemours).

The invention also provides a method of manufacturing a rigid multilayer material in accordance with any of the preceding variants by means of adhesive, in which the adhesive is placed solely on the end edges of the walls of said cells, the method being characterized in that it comprises at least the following steps:

placing a film of adhesive on the surface of said honeycomb plate;

heating said film to burst the cells; thereby causing the adhesive to shrink onto the end edges of said cells; and pressing the panels together.

BRIEF DESCRIPTION OF THE DRAWINGS

Other characteristics and advantages of the invention appear from the following detailed description and the accompanying drawings, in which:

FIG. 1 is a diagrammatic perspective view showing an example of sandwiched rigid multilayer material in accordance with the invention;

FIG. 2 is a diagrammatic perspective and exploded view of the FIG. 1 sandwich;

FIG. 3 is a transparent projection view showing a few cells in two adjacent layers of the honeycomb material which are offset to minimize heat exchange by conduction; and FIG. 4 is a diagrammatic perspective view of a honeycomb cell in accordance with the invention which is pierced to make it possible for the cell to empty out while the material is put into a vacuum.

MORE DETAILED DESCRIPTION

The same references are used to designate the same elements in all of the figures; for reasons of clarity, the scale is not always the same.

FIG. 1 is a diagrammatic perspective view showing an example of a rigid multilayer material of the invention. The material consists in a sandwiched stack of layers of honeycomb 2 and of skins 1. In the example of FIG. 1, these layers alternate, there being N plates of honeycomb 2 alternating with N+1 aluminum- or gold-coated skins 1. The skins are preferably made of an insulating structural material, for example glass-epoxy, and they are coated with gold or aluminum in order to obtain low emissivity and thus minimize heat transmission by radiation between successive layers, given the large facing areas of the skins.

The honeycomb is made of a material that is highly insulating (PEI, NOMEX, or the like) in order to obtain a high level of resistance to heat conduction. NOMEX® is an aramid paper (aromatic polyamide). One manufacturer of honeycomb made of NOMEX® is the supplier Euro-composite SA of Echternach, Luxembourg.

The successive layers are assembled together, e.g. by adhesive. In order to conserve the optical properties (low emissivity) of the skins 1, it is important to avoid dirtying them with adhesive. It is therefore preferable to place adhesive only on the end edges of the honeycomb plates 2. An original method for implementing the invention constitutes the subject matter of the sole method claim. The method of the invention comprises at least the following steps:
- placing a film of adhesive on the surface of said honeycomb plate 2;
- heating said film to burst the cells; thereby causing the adhesive to shrink onto the end edges of said cells; and
- pressing the panels together.

FIG. 2 is a diagrammatic perspective and exploded view of the sandwich of FIG. 1. The multilayer sandwich may have as many plates of honeycomb as needed for the intended application. Increasing the number, N, of plates increases the rigidity and the load-carrying ability of the structure, and also increases its insulating ability. In the example of FIG. 2, it can be seen that in order to assemble the sandwich, it is possible to begin with a first operation of using adhesive to stick together pairs, each pair comprising one skin 1 and one honeycomb plate 2, preferably using the steps set out in the preceding paragraph. Thereafter, the same adhesive method is applied on the other faces of the honeycomb plates 2, and the entire sandwich is stuck together to obtain the finished material as shown in FIG. 1.

In a particularly advantageous embodiment as shown in FIG. 3, the cells of the first honeycomb plate 3 are offset relative to the cells of a second plate 4 adjacent to the first. In this figure, it can be seen that the end edges of the walls A of the first plate 3 are offset relative to the end edges of the walls B of the second plate 4, so that contact between the two honeycomb plates take place only at a few points C through which it is possible for heat conduction to take place, thereby considerably reducing thermal conductivity through the sandwich structure as a whole. This improvement in performance is obtained without adding layers, and thus for constant weight and size.

FIG. 4 is a diagrammatic perspective view of a single honeycomb cell in an advantageous embodiment of the invention, which cell is pierced to allow it to empty out when the material is put into a vacuum. During manufacture of a sandwich of the kind described with reference to FIGS. 2 and 3, closing the cells by sticking a skin onto each of the two main faces of a honeycomb plate can lead to air being imprisoned inside the cells. In order to ensure that the imprisoned air does not burst the cells when the material is put into a vacuum, and in order to ensure degassing during insertion into orbit, holes V are advantageously pieced through some of the side walls P of each cell.

It should also be observed in FIG. 4 that the cells are wider than they are high, given that the diameter $\underline{d}$ of each cell is at least twice its height $\underline{h}$, thereby providing as large an optical viewing angle as possible for the facing aluminum- or gold-coated skins, and guaranteeing that the radiation emitted by each surface is absorbed as little as possible by the honeycomb cellular structure which itself is generally not reflecting.

By way of example, a material of the invention could have the following characteristics:
- skin thickness: 0.2 millimeters (mm);
- skin conductivity: 0.2 watts per meter per degree centigrade (W/m° C.);
- skin emissivity: 0.4 (gold-coated);
- thickness of honeycomb: 3 mm ($\underline{h}$) for a mesh size of 6 mm ($\underline{d}$);
- thickness of the honeycomb walls: 0.01 mm;
- thermal conductivity of the honeycomb: 0.1 W/m° C.;
- emissivity of the honeycomb: 0.8.

In a version having five skins (N+1=5) of thickness equal to 0.2 mm together with four (N=4) honeycomb plates of NOMEX® ECA 6.4–50 having a thickness of 3 mm (manufactured by Euro-composite SA, Echternach, Luxembourg), the skins being made of glass-epoxy polymerized with an aluminized film of Kapton® (Dupont Nemours) having a thickness of 25 microns ($\mu$m) on each surface, and film adhesive manufactured by Hexcel under the reference BSL 312 UL, the following characteristics have been measured on a sample of the above-described product:
- total thickness: 13.4 mm;
- weight: about 4 kilograms per square meter (kg/m$^2$);
- 3-point bending on a 300 mm×40 mm test piece supported at 260 mm and loaded in the center: bending stiffness (EI) of 3910 decanewtons square centimeters (daN.cm$^2$/cm) of test piece width;
- insulating power: $\lambda z = 4.6 \times 10^{-3}$ watts per meter per Kelvin (W/m/K) (−30° C.=, $\epsilon$=0.07.

The measured values are close to simulations carried out while studying the material theoretically.

In addition, the material possesses properties that make it easy to use for manufacturing insulating structures for use in space. Mechanical destruction tests and vacuum tests have been satisfactory. The material can be machined by milling, or it can be pierced with a sharp tool not having a helix. Foreign bodies can be inserted into the material, e.g. in order to enable it to be fixed in place. Its margins can be finished using Kapton® adhesive, for example.

Such a material presents numerous advantages for making structures that are lightweight and rigid, presenting good thermal insulation characteristics. Compared with the prior art in which those two functions have been provided separately, all of its characteristics are improved. Variations in the various examples described above can easily be imagined by the person skilled in the art without thereby going beyond the ambit of the invention, with the main characteristics thereof appearing in the following claims.

What is claimed is:
1. A multilayer material, comprising:
   at least one rigid plate of insulating honeycomb material sandwiched between two aluminum- or gold-coated skins of low emissivity, wherein said honeycomb material comprises a plurality of cells, each of said cells having a width measured in the plane of said plate that is at least twice a height of said cell measured perpendicular to said plate;

said multilayer material being configured for thermal insulation in a vacuum in space; and wherein side walls of said cells are pierced in order to allow said material to empty out when placed in the vacuum.

2. A material according to claim 1, comprising a plurality, N, of honeycomb plates sandwiched between at least two aluminum- or gold-coated skins.

3. A material according to claim 2, in which the cells of adjacent plates are offset laterally so as to minimize points of contact between the walls of the cells in one plate and the walls of the cells in an adjacent plate.

4. A material according to claim 1, wherein said aluminum- or gold-coated skins are made of glass-epoxy.

5. A material according to claim 1, characterized in that said honeycomb material is made of a highly insulating material.

6. A method of manufacturing a rigid multilayer material, said rigid multilayer material including at least one plate of insulating honeycomb material sandwiched between two aluminum- or gold-coated skins of low emissivity, wherein said honeycomb material comprises a plurality of cells, each of said cells having a width measured in the plane of said plate that is at least twice a height of said cell measured perpendicular to said plate, wherein adhesive is deposited on end edges of walls of said cells, the method comprising:

placing a film of adhesive on a surface of said honeycomb plate;

heating said film to burst the cells; thereby causing the adhesive to shrink onto the end edges of said cells; and pressing one of said skins together with said honeycomb plate.

7. The material according to claim 1, wherein the width of each cell is a maximum width of the cell measured in the plane of the plate.

8. The material according to claim 1, wherein the honeycomb material is made of polyetherimide.

9. The material according to claim 1, wherein the honeycomb material is made of aramid.

10. The material according to claim 1, configured for use on a spacecraft in space.

11. The material according to claim 1, having a low emissivity adequate for use on a spacecraft in space.

12. The material according to claim 1, wherein said material has a bending stiffness (EI) of 3910 decanewtons square centimeters (daN.cm$^2$/cm) for 3-point bending on a 300 mm×40 mm test piece of said material supported at 260 mm and loaded in the center.

13. The material according to claim 1, wherein said material has an insulating power $\lambda z=4.6\times10^{-3}$ watts per meter per Kelvin (W/m/K) at −30° C. and $\epsilon=0.07$.

14. A spacecraft including the material according to claim 1.

15. A rigid multilayer material for thermal insulation in a vacuum, the material comprising at least one plate of insulating honeycomb material sandwiched between two aluminum- or gold-coated skins of low emissivity, wherein said honeycomb material comprises a plurality of cells, wherein said aluminum- or gold-coated skins are made of glass-epoxy.

16. The spacecraft according to claim 14, wherein said pierced side walls of said cells allow said material to empty out when said spacecraft is placed in the vacuum of space.

17. A multilayer material, comprising:

at least one rigid plate of insulating honeycomb material sandwiched between two aluminum- or gold-coated skins of low emissivity, wherein said honeycomb material comprises a plurality of cells, each of said cells having a width measured in the plane of said plate that is at least twice a height of said cell measured perpendicular to said plate;

said multilayer material being configured for thermal insulation in a vacuum in space; and wherein said aluminum- or gold-coated skins are made of glass-epoxy.

* * * * *